(12) United States Patent
Iqbal et al.

(10) Patent No.: US 10,936,522 B1
(45) Date of Patent: Mar. 2, 2021

(54) PERFORMING INPUT-OUTPUT MULTI-PATHING FROM USER SPACE

(71) Applicant: EMC IP Holding Company LLC, Hopkinton, MA (US)

(72) Inventors: Md Haris Iqbal, Kolkata (IN); Kundan Kumar, Bangalore (IN); Sanjib Mallick, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/587,533

(22) Filed: Sep. 30, 2019

(51) Int. Cl.
*G06F 13/40* (2006.01)
*G06F 13/16* (2006.01)

(52) U.S. Cl.
CPC ...... *G06F 13/4027* (2013.01); *G06F 13/1668* (2013.01)

(58) Field of Classification Search
CPC ............ G06F 13/1668; G06F 13/4027
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,454,437 B1 | 11/2008 | Lavallee et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,904,681 B1 | 3/2011 | Bappe et al. |
| 7,925,872 B2 | 4/2011 | Lai et al. |
| 8,825,919 B1 | 9/2014 | Lim et al. |
| 8,874,746 B1 | 10/2014 | Gonzalez |
| 9,026,694 B1 | 5/2015 | Davidson et al. |
| 9,400,611 B1 | 7/2016 | Raizen |
| 9,594,780 B1 | 3/2017 | Esposito et al. |
| 9,778,852 B1 | 10/2017 | Marshak et al. |
| 10,353,714 B1 | 7/2019 | Gokam et al. |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Zachary K Huson
(74) *Attorney, Agent, or Firm* — Ryan, Mason & Lewis, LLP

(57) ABSTRACT

An apparatus comprises a host device configured to communicate over a network with a storage system comprising a plurality of storage devices. The host device is configured to implement a multi-path input-output driver for delivery of input-output operations from the host device to the storage system over the network. The multi-path input-output driver is configured to perform, in user space of the host device, discovery of paths to logical storage volumes of the storage system, to identify two or more of the paths providing connection to a given one of the logical storage volumes, to generate, in the user space of the host device, a given multi-path logical device grouping the identified two or more paths providing connection to the given logical storage volume, and to submit input-output operations directed to the given logical storage volume via the given multi-path logical device in the user space of the host device.

20 Claims, 4 Drawing Sheets

(56) References Cited

U.S. PATENT DOCUMENTS

| | | | |
|---|---|---|---|
| 2004/0010563 A1 | 1/2004 | Forte et al. | |
| 2006/0277383 A1 | 12/2006 | Hayden et al. | |
| 2008/0043973 A1 | 2/2008 | Lai et al. | |
| 2009/0119685 A1* | 5/2009 | Phelan | G06F 9/45558 |
| | | | 719/324 |
| 2011/0197027 A1 | 8/2011 | Balasubramanian et al. | |
| 2011/0296230 A1 | 12/2011 | Chen et al. | |
| 2015/0222705 A1 | 8/2015 | Stephens | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2018/0189635 A1 | 7/2018 | Olarig et al. | |
| 2018/0210665 A1* | 7/2018 | Anumula | G06F 3/0644 |
| 2019/0095299 A1 | 3/2019 | Liu et al. | |
| 2019/0108888 A1 | 4/2019 | Sarkar et al. | |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828, filed in the name of Sanjib Mallick et al. Dec. 21, 2017 and entitled "Storage System with Input-Output Performance Control Utilizing Application Process Detection."

U.S. Appl. No. 15/795,653, filed in the name of Maneesh Pusalkar et al. Oct. 27, 2017 and entitled "Storage System with Network-Wide Configurable Device Names."

U.S. Appl. No. 16/142,274, filed in the name of Sanjib Mallick et al. Sep. 26, 2018 and entitled "Host Device with Multi-Path Layer Implementing Automatic Standby Setting for Active-Active Configuration."

* cited by examiner

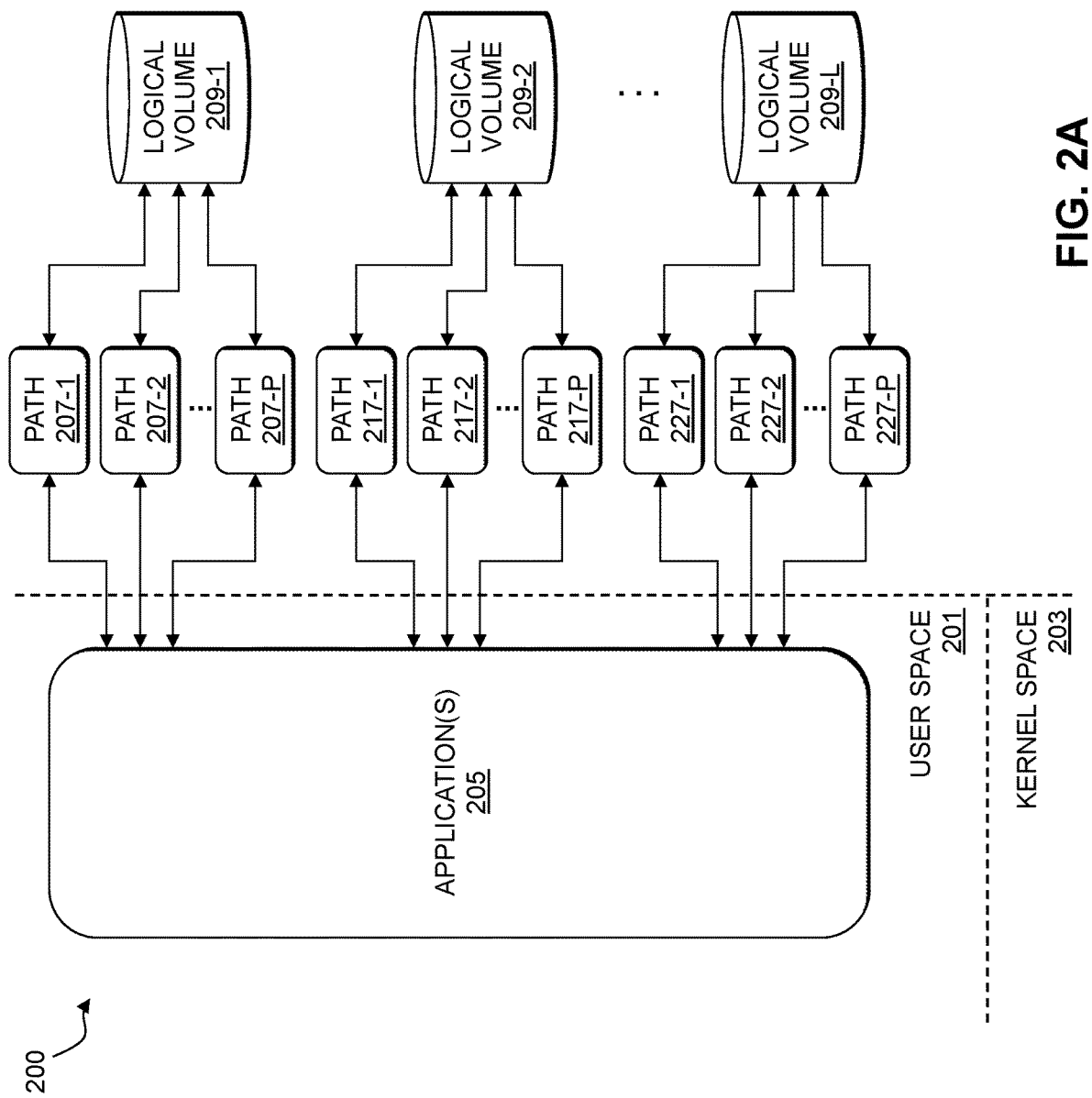

PERFORMING INPUT-OUTPUT MULTI-PATHING FROM USER SPACE

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operations for delivery to the storage system. A given host device may comprise a multi-path input-output (MPIO) driver that is configured to process input-output (IO) operations for delivery from the given host device to storage systems over multiple paths between the given host device and the storage systems.

SUMMARY

Illustrative embodiments disclose techniques for performing input-output multi-pathing from user space.

In one embodiment, an apparatus comprises a host device configured to communicate over a network with a storage system comprising a plurality of storage devices. The host device comprises a processor coupled to a memory configured to implement a multi-path input-output driver for delivery of input-output operations from the host device to the storage system over the network. The multi-path input-output driver is configured to perform, in user space of the host device, discovery of a plurality of paths to one or more logical storage volumes of the storage system, to identify two or more of the plurality of paths providing connection to a given one of the one or more logical storage volumes, to generate, in the user space of the host device, a given multi-path logical device grouping the identified two or more paths providing connection to the given logical storage volume, and to submit input-output operations directed to the given logical storage volume via the given multi-path logical device in the user space of the host device.

These and other illustrative embodiments include, without limitation, apparatus, systems, methods and computer program products comprising processor-readable storage media.

BRIEF DESCRIPTION OF THE DRAWINGS

FIGS. 2A and 2B illustrate path detection and generation of user space multi-path pseudodevices in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
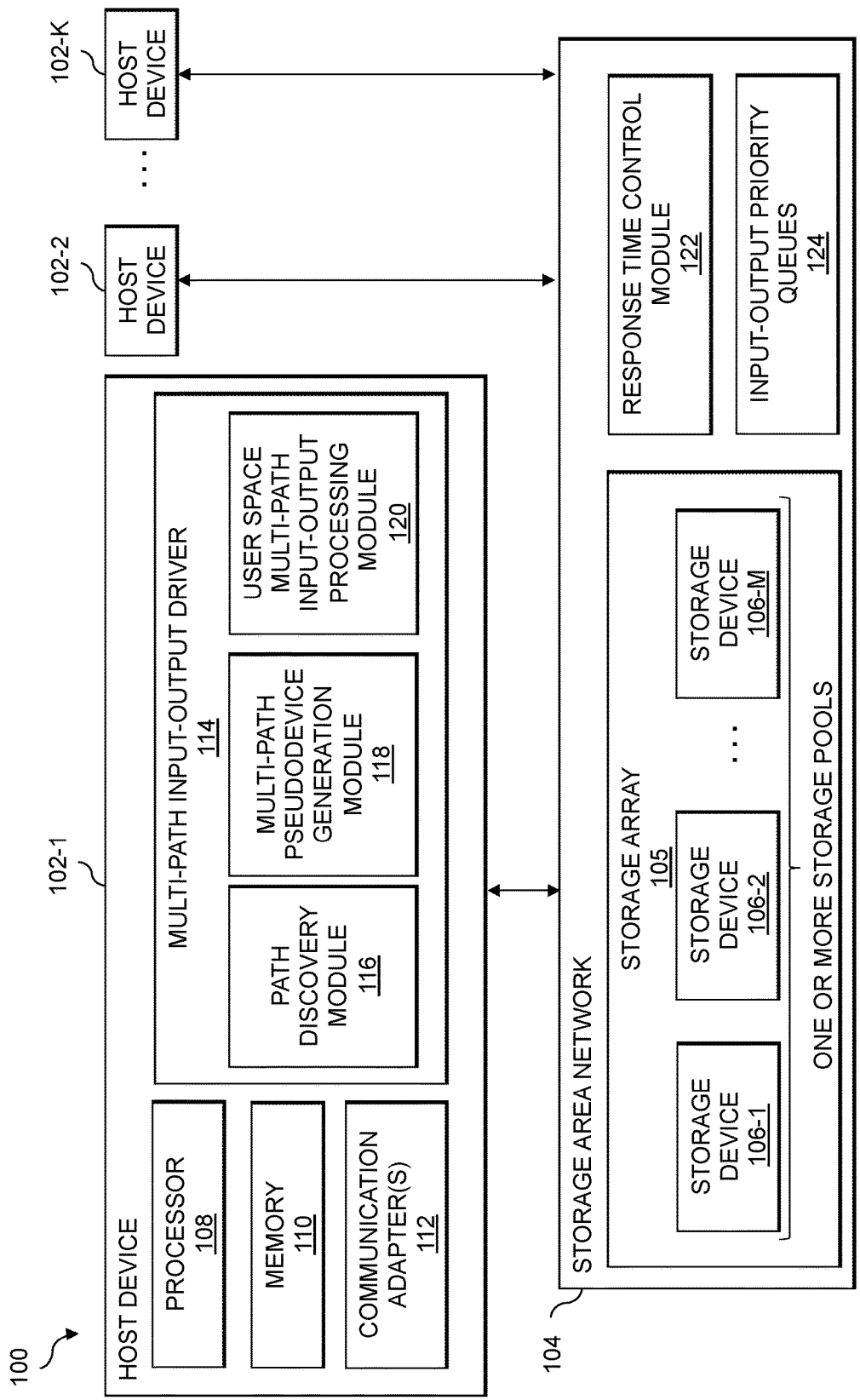
FIG. 1 is an example block diagram of an information processing system configured with functionality to perform input-output multi-pathing from user space of a host device in an illustrative embodiment.

FIG. 1 shows an information processing system 100 configured in accordance with an illustrative embodiment. The information processing system 100 comprises a plurality of host devices 102-1, 102-2, . . . 102-K (collectively, host devices 102). The host devices 102 communicate over a storage area network (SAN) 104 with at least one storage array 105. The storage array 105 comprises a plurality of storage devices 106-1, 106-2 . . . 106-M (collectively, storage devices 106) each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical storage volumes such as, e.g., logical units (LUNs), that are configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments including but not limited to Internet SCSI (iSCSI) commands, transmission control protocol (TCP) commands, remote direct memory access (RDMA) commands, non-volatile memory express (NVMe) commands, etc. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device 102 on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

As shown in FIG. 1, host device 102-1 comprises a processor 108, a memory 110, and communication adapters 112.

The processor 108 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 110 may comprise random access memory (RAM), read-only memory (ROM), flash memory or other types of memory, in any combination. The memory 110 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

The communication adapters 112 may comprise, for example, host bus adapters (HBAs) or any other communication or network adapter that may be used to connect to a network (e.g., a network fabric) that allows communication between the host device 102-1 and the storage array 105. In some embodiments, the communication adapters 112 implement an NVMe architecture. NVMe communication adapters can each have multiple hardware IO submission queues depending on the HBA vendor. As an example, an NVMe over fabric (NVMe-oF) capable HBA can have up to 64,000 IO submission queues and 64,000 IO completion queues. Other numbers of IO submission queues and IO completion queues may be present in other embodiments.

The processor 108 and memory 110 provide a processing device that implements a multi-path input-output (MPIO) driver 114. The MPIO driver 114 may comprise, for example, an otherwise conventional MPIO driver, such as PowerPath® drivers from Dell EMC, suitably modified in the manner disclosed herein to provide IO multi-pathing from user space of the host device 102-1. Other types of MPIO drivers from other driver vendors may be suitably modified to incorporate functionality for IO multi-pathing from user space as disclosed herein.

The MPIO driver 114 is configured to deliver IO operations selected from a corresponding set of IO queues to the storage array 105 via selected ones of multiple paths over the SAN 104. The sources of the IO operations stored in the set of IO queues illustratively include respective processes of one or more applications executing on the host device 102-1 (e.g., in user space of the host device 102-1). For example, IO operations can be generated by each of multiple processes of a database application running in user space on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising one of the communication adapters (e.g., a HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 114 in delivering IO operations from the IO queues to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 114, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with the addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The paths between a given one of the host devices (e.g., host device 102-1) and the storage array 105 may be associated with IO pathway information. Such IO pathway information may be used by the MPIO driver 114 of the host device 102-1 to transmit data to or receive data from the storage array 105 using a defined IO pathway. In illustrative embodiments, the MPIO driver 114 groups paths from the host device 102-1 to a particular LUN or other logical storage volume into a single logical device, referred to as a multi-path logical device. In illustrative embodiments, as described in further detail below, such multi-path logical devices are implemented as multi-path pseudodevices in user space of the host device 102-1. Applications on the host device 102-1 utilize the multi-path logical devices (e.g., the multi-path pseudodevices in user space in illustrative embodiments) for IO operations. In this way, the IO operations may be distributed across available IO paths. Also, if a particular one of the IO paths fails, the MPIO driver 114 can redirect IO operations from the failed IO path to other alive IO paths.

Although not shown in FIG. 1, it is assumed that other ones of the host devices 102-2 through 102-K also implement MPIO drivers configured in a manner similar to that described above and elsewhere herein for the MPIO driver 114. The other host devices 102-2 through 102-K of the system 100 are therefore also configured to communicate over the SAN 104 with the storage array 105. The MPIO drivers of such other host devices are each similarly configured to deliver IO operations from its corresponding set of IO queues to the storage array 105 over selected paths through the SAN 104, and to perform the disclosed functionality for IO multi-pathing from user space.

Accordingly, functionality described above in the context of the MPIO driver 114 and host device 102-1 is assumed to be similarly performed by MPIO drivers implemented by host devices 102-2 through 102-K.

The MPIO drivers may be otherwise configured utilizing well-known MPIO functionality such as that described in K. Piepho, "Dell EMC SC Series Storage: Microsoft Multipath 110," Dell EMC Engineering, June 2017, which is incorporated by reference herein. Such conventional MPIO functionality is suitably modified in illustrative embodiments disclosed herein to support secure storage access.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMe-oF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 122 and IO operation priority queues 124, illustratively configured to make use of the above-described persistent memory. For example, the response time control module 122 may be used to implement storage array based adjustments in response time for particular IO operations based at least in part on service level objective (SLO) information stored by the storage array 105 in its persistent memory. The response time control module 122 operates in conjunction with the IO operation priority queues 124.

The storage array 105 utilizes its IO operation priority queues 124 to provide different levels of performance for IO operations. For example, the IO operation priority queues 124 may have respective different priority levels. The storage array 105 may be configured to provide different priority levels for different ones of the IO operations by assigning different ones of the IO operations to different ones of the IO operation priority queues 124. The IO operation priority queues 122 are illustratively associated with respective SLOs for processing of IO operations in the storage array 105.

Process tags may be used in assigning different ones of the IO operations to different ones of the IO operation priority queues 124, as disclosed in the above-cited U.S. patent application Ser. No. 15/849,828.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise various types of storage products, including all-flash and hybrid flash storage arrays, software-defined storage products, cloud storage products, object-based storage products, and scale-out NAS clusters. Combinations of multiple ones of these and other storage products can also be used in implementing the storage array 105 or more generally a storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

System memory may be divided into two regions, referred to as kernel space and user space. In the kernel space, the kernel or core of an operating system (OS) (e.g., a kernel driver) executes to provide services. The user space provides a set of memory locations in which user processes execute, where the user processes are executing instances of programs or applications. The kernel space is accessed by the user space through system calls to perform services by the kernel.

In some cases, it is desired to move JO paths and functionality from the kernel space to the user space. Thus, JO operations submitted by the applications or user processes do not use the kernel driver. User space software for such JO stacks can utilize function calls and libraries to form and establish connections with storage arrays from the user space. After establishment of connections, submission of IO operations can also happen directly from the user space, rather than invoking system calls to the kernel space to submit JO operations. Advantageously, such arrangements avoid the need for copying data from the user space to the kernel space. Such arrangements also avoid interrupts, and thus provide higher throughput. An example of software that enables submission of JO operations directly from the user space is the Storage Performance Development Kit (SPDK). The SPDK software may use different kinds of underlying transport protocol, including but not limited to RDMA, TCP, and iSCSI. SPDK and other types of software also support NVMe-oF target.

In some embodiments, multi-pathing software is provided that groups all paths from a host device, such as host device 102-1, to a LUN or other logical storage volume (e.g., of storage array 105) into a single multi-path logical device. Such multi-path logical devices are also referred to herein as multi-path pseudodevices. Individual block devices representing each path are referred to as native devices. Applications use a multi-path pseudodevice for JO operations, such that the JO operations can be distributed across all available paths. Also, when paths fail, the multi-pathing software will redirect JO operations to other live paths. Illustrative embodiments provide techniques which provide such multi-pathing functionality without working on kernel drivers to form multi-path logical devices.

In the FIG. 1 system, the MPIO driver 114 implements various functional modules for performing IO multi-pathing from user space of the host device 102-1 (e.g., over the communication adapters 112 to the storage devices 106 of storage array 105). Such functional modules include a path discovery module 116, a multi-path pseudodevice generation module 118 and a user space MPIO processing module 120.

The path discovery module 116, the multi-path pseudodevice generation module 118 and the user space MPIO processing module 120, in some embodiments, implement what is referred to as User Space Multi-Pathing Enabler (USeME) software that enables multi-pathing capability from user space. The USeME software runs when connections are established (e.g., using user space software such as SPDK) from host device 102-1 to a storage array such as storage array 105. The path discovery module 116 is configured to scan for detected devices or logical storage volumes, and send commands to get a unique identifier (ID), such as a Namespace Globally Unique Identifier (NGUID), for each detected device or logical storage volume. The multi-path pseudodevice generation module 118 then groups all devices or logical storage volumes having the same unique identifier (e.g., the same NGUID) and forms a multi-path pseudodevice on top of these in the user space.

The user space MPIO processing module 120 is configured to allow applications in the user space to utilize the user space multi-path pseudodevices generated by module 118 to submit IO operations or requests (instead of using user space native devices). In this way, IO multi-pathing is performed completely in the user space. Thus, from the user space only, USeME provides the functionality of load balancing, IO failover, etc. This improves on user space IO submission functionality (e.g., such as that provided in SPDK, which does not determine the different paths belonging to a same LUN or other logical storage volume).

The hardware in enterprise systems provides multiple IO path connections (e.g., multiple wired connections) between the host devices 102 and the storage array 105. Such multiple IO path connections provide high throughput and failover capabilities to applications submitting IO operations. Without the use of USeME, user space IO submissions will be unable to recognize such multiple paths, and thus will not provide increased throughput and IO failover (e.g., path failover) functionalities enabled in such systems.

The USeME software enables creation of multi-path pseudodevices in user space. The USeME software is configured to fetch the unique ID from each path and form a user space multi-path pseudodevice for a collection of paths (devices) having the same unique ID. These USeME-created user space multi-path pseudodevices are used by applications to submit IO operations or requests. The IO requests are mapped to an appropriate user space multi-path pseudodevice (e.g., for the LUN or other logical volume that is the target of a particular IO operation or request). The user space multi-path pseudodevices then submits the IO requests to one of the native paths. While submitting the IO requests to the native paths, the USeME software again uses user space submission.

In some embodiments, USeME utilizes the following steps for recognition of devices or logical storage volumes (e.g., native paths or more generally paths). On boot up (e.g., of a host device such as host device 102-1), user space IO submission software (e.g., SPDK) performs discovery and establishes connections between host interfaces and a storage array front end (e.g., of storage array 105) using user space interfaces. Various underlying protocols, such as RDMA, TCP, etc., are used by the user space IO submission software to establish the connections. Advantageously, USeME software provides multi-pathing functionality that is independent of the underlying transport protocol used for connecting to a particular LUN or other logical storage volume.

On each of these connections, various native paths to LUNs or other logical storage volumes are created. The user space IO submission software recognizes each native path and forms a block device layer (BDEV) device on top of each native path. The block device layer or BDEV provides functionality similar to an operating system block storage layer that sits above device drivers in a kernel storage stack. The BDEV provides a common application programming interface (API) for implementing block devices that interface with various types of block storage devices (e.g., to provide driver modules, for performing IO operations, etc.). Once the connections are established by the user space IO submission software, USeME software is run to scan the formed devices/BDEVs (e.g., via scanning user space NVME devices). This process will iterate through all devices and paths to fetch the unique ID for each. USeME then forms a multi-path pseudodevice as a collection of paths having the same unique ID. In some embodiments, the following data structure is utilized for a multi-path pseudodevice:

struct mpath_pseudo_bdev {
  char*uniqueID;
  struct path1_bdev;
  struct path2_bdev;
  . . .
  struct pathN_bdev;
  }

In some embodiments, the ordering of the paths in the above data structure may be arbitrary. Load balancing logic or other path selection logic may be used to select amongst the available paths identified in the data structure to service particular IO requests. Applications are able to send IO requests to the multi-path pseudodevice BDEV name formed as described above.

On IO failure, the USeME software can take various steps. IO failure on a dead path may be retried on other live paths when the user space IO submission software gets an IO failure. For retrying on IO failure, a retry function is called that checks for other live paths and submits or retries the failed IO request on such other paths. If successful (e.g., on completion of the failed IO request on another live path), the USeME software can call the requesting application's "complete_IO" function to indicate that the IO request has been completed.

Example interaction paths between the host device 102-1 and storage array 105 using a user space multi-path logical device or multi-path pseudodevice controlled by the MPIO driver 114 will now be described. In user space, an application resident on the host device 102-1 submits IO operations for processing. The MPIO driver 114 will select the IO operations for delivery via a multi-path logical device or multi-path pseudodevice that is implemented in user space as described above. The multi-path pseudodevice illustratively provides one or more IO entry points configured to receive selected IO operations and submit the selected IO operations to an IO load balancing component of the MPIO driver 114. The IO load balancing component performs load balancing, for example, by assigning the IO operations to different paths of the multi-path pseudodevice. IO path discovery scans, as described above, may be used to populate or generate the different paths in the multi-path pseudodevices implemented in user space.

In some embodiments, IO operations are balanced across the available paths in the multi-path pseudodevice. For example, if there are three paths, the IO operations may be split evenly amongst the three paths. It should be appreciated, however, that in other embodiments a given path may receive all, none or any desired portion of the IO operations. The number of IO operations assigned to a particular path, for example, may be determined based on the current load on each path or using other load balancing techniques. A lower level device driver may be configured to receive the IO operations from the different paths and to transfer the IO operations to logical volumes of the storage array 105.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, etc. can be used in other embodiments. By way of example, although not explicitly shown in FIG. 1, each of the other host devices 102-2 through 102-K is assumed to be similarly configured with a processor, memory, communication adapters and a MPIO driver implementing functional modules for performing IO multi-pathing from user space of that host device over its communication adapters to the storage devices 106 of storage array 105. Similarly, it should be appreciated that one or more of the host devices 102 may be configured for communication with multiple distinct SANs and storage arrays although only single instances of such are shown in FIG. 1.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2B:
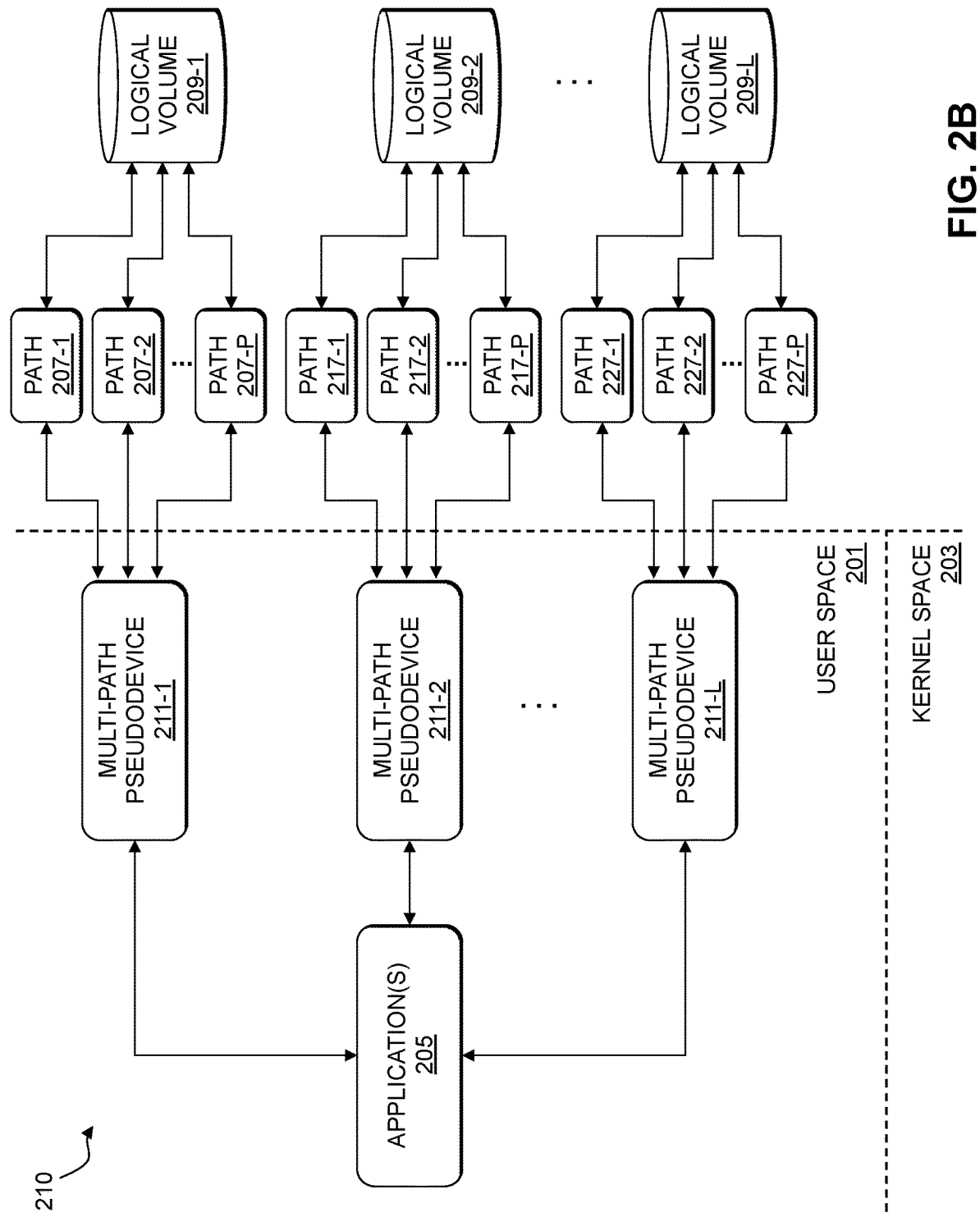

FIGS. 2A and 2B illustrate path detection and generation of user space multi-path pseudodevices. Each of FIGS. 2A and 2B show a user space 201 and a kernel space 203, with one or more applications 205 running in the user space 201. FIG. 2A shows a view 200 of native paths that are discovered (e.g., by path discovery module 116). A set of one or more applications 205 running in user space 201 discovers native paths to a set of logical volumes 209-1, 209-2, . . . 209-L (collectively, logical volumes 209). The logical volumes 209 may represent different LUNs of an NVMe device. It should be noted that the particular number of logical volumes 209, denoted L, may vary. In some cases, for example, there is just a single logical volume (e.g., 209-1). In other embodiments, L may be 2, 3 or more.

In the FIG. 2A embodiment, it is assumed that there are multiple native paths to each of the logical volumes 209. As shown, there is a first set of native paths 207-1, 207-2, . . . 207-P (collectively, paths 207) to the logical volume 209-1, a second set of native paths 217-1, 217-2, . . . 217-P (collectively, paths 217) to logical volume 209-2 and an $L^{th}$ set of native paths 227-1, 227-2, . . . 227-P (collectively, paths 227) to logical volume 209-L. The particular number of paths, denoted P, may vary for different ones of the logical volumes 209. In other words, the value of "P" for paths 207 may be different than the value of "P" for paths 217 or 227. For example, there may be three native paths to the logical volume 209-1, while there are just two native paths to the logical volume 209-2. It should be appreciated, however, that not all logical volumes in a particular environment are required to have multiple native paths. For example, one or more of the logical volumes 209 may have just a single native path to a particular host device (e.g., its associated "P" value is 1).

FIG. 2B shows a view 210 of multi-path pseudodevices 211-1, 211-2, . . . 211-L (collectively, multi-path pseudodevices 211) that are generated (e.g., by multi-path pseudodevice generation module 118) after discovery of the native paths 207, 217, 227 (e.g., by path discovery module 116). A multi-path pseudodevice 211 is generated for each of the logical volumes 209 (e.g., there is a one-to-one correspondence between logical volumes 209 and multi-path pseudodevices 211). The multi-path pseudodevice generation module 118 groups together all native paths with the same unique ID for a given one of the logical volumes 209 into a given multi-path pseudodevice 211 for the given logical volume 209. As shown in FIG. 2B, the multi-path pseudodevices 211 are provided in user space 201. The user space MPIO processing module 120 enables the applications 205 running in user space 201 to submit IO requests to the multi-path pseudodevices 211. Advantageously, no changes are required to the applications 205 to enable user space IO multi-pathing. As described elsewhere herein, multi-pathing functionality may be utilized for load balancing, IO path failover, etc.

An exemplary process for performing IO multi-pathing from user space will now be described in more detail with reference to the flow diagram of FIG. 3. It is to be understood that this particular process is only an example, and that additional or alternative processes for performing IO multi-pathing from user space may be used.

In this embodiment, the process includes steps 300 through 306. These steps are assumed to be performed by the MPIO driver 114 utilizing the path discovery module 116, the multi-path pseudodevice generation module 118 and the user space MPIO processing module 120. The process begins with step 300, performing, in user space, discovery of a plurality of paths to one or more logical storage volumes of the storage array 105. Step 300 may include utilizing user space host interfaces to establish connection between the host device 102-1 and a front end of the storage array 105 hosting the one or more logical storage volumes. Establishing connection between the host device 102-1 and the front end of the storage array 105 may utilize two or more different communication protocols, such as two or more of RDMA, TCP, SCSI, iSCSI, NVMe, etc.

In step 302, two or more of the plurality of native paths providing connection to a given one of the one or more logical storage volumes are identified. Step 302 may include sending a command over each of the plurality of native paths for a unique identifier of its associated logical storage volume, and identifying ones of the native paths returning a given unique identifier associated with the given logical storage volume as the two or more native paths providing connection to the given logical storage volume. The given unique identifier associated with the given logical storage volume may comprise a NGUID for the given logical storage volume or another type of identifier of the given logical storage volume.

The process continues with step 304, where a given multi-path logical device grouping the identified two or more native paths providing connection to the given logical storage volume is generated in user space of the host device 102-1. Step 304 may include forming, in a block device layer in the user space of the host device, a block device for each of the identified two or more native paths providing connection to the given logical storage volume, and creating a given multi-path pseudodevice as a collection of the block devices for each of the identified two or more native paths providing connection to the given logical storage volume. The given multi-path pseudodevice may comprise a data structure specifying a multi-path identifier for the given multi-path pseudodevice, a unique identifier of the given logical storage volume, and identifiers of the block devices formed for each of the identified two or more native paths providing connection to the given logical storage volume. The given multi-path logical device provides multi-pathing functionality for applications running in the user space of the host device 102-1 independent of a transport protocol utilized by the identified two or more native paths providing connection to the given logical storage volume.

In step 306, IO operations directed to the given logical storage volume are submitted via the given multi-path logical device in the user space of the host device. Step 306, in some embodiments, bypasses a kernel space of the host device 102-1. Bypassing the kernel space of the host device 102-1 may comprise providing data of the submitted input-output operations directly to the storage array 105 over at least one of the identified two or more native paths providing connection to the given logical storage volume via at least one of the communication adapters 112 without copying the data of the submitted input-output operations from the user space of the host device 102-1 to the kernel space of the host device 102-1.

It should be appreciated that steps 302 through 304 may be repeated for additional logical storage volumes to generate additional multi-path logical devices grouping identified native paths providing connection to such additional logical storage volumes of the storage array 105. Step 306 may also be repeated as desired for IO operations submitted to such additional logical storage volumes via or using such additional multi-path logical devices in the user space of the host device 102-1.

Step 306, in some embodiments, comprises utilizing the given multi-path logical device to provide load balancing across the identified two or more native paths providing connection to the given logical storage volume. Step 306, in other embodiments, further or alternatively comprises utilizing the given multi-path logical device to provide input-output failover by re-routing a given input-output operation from a failed one of the identified two or more native paths providing connection to the given logical storage volume to an alive one of the identified two or more native paths providing connection to the given logical storage volume.

Figure 3:
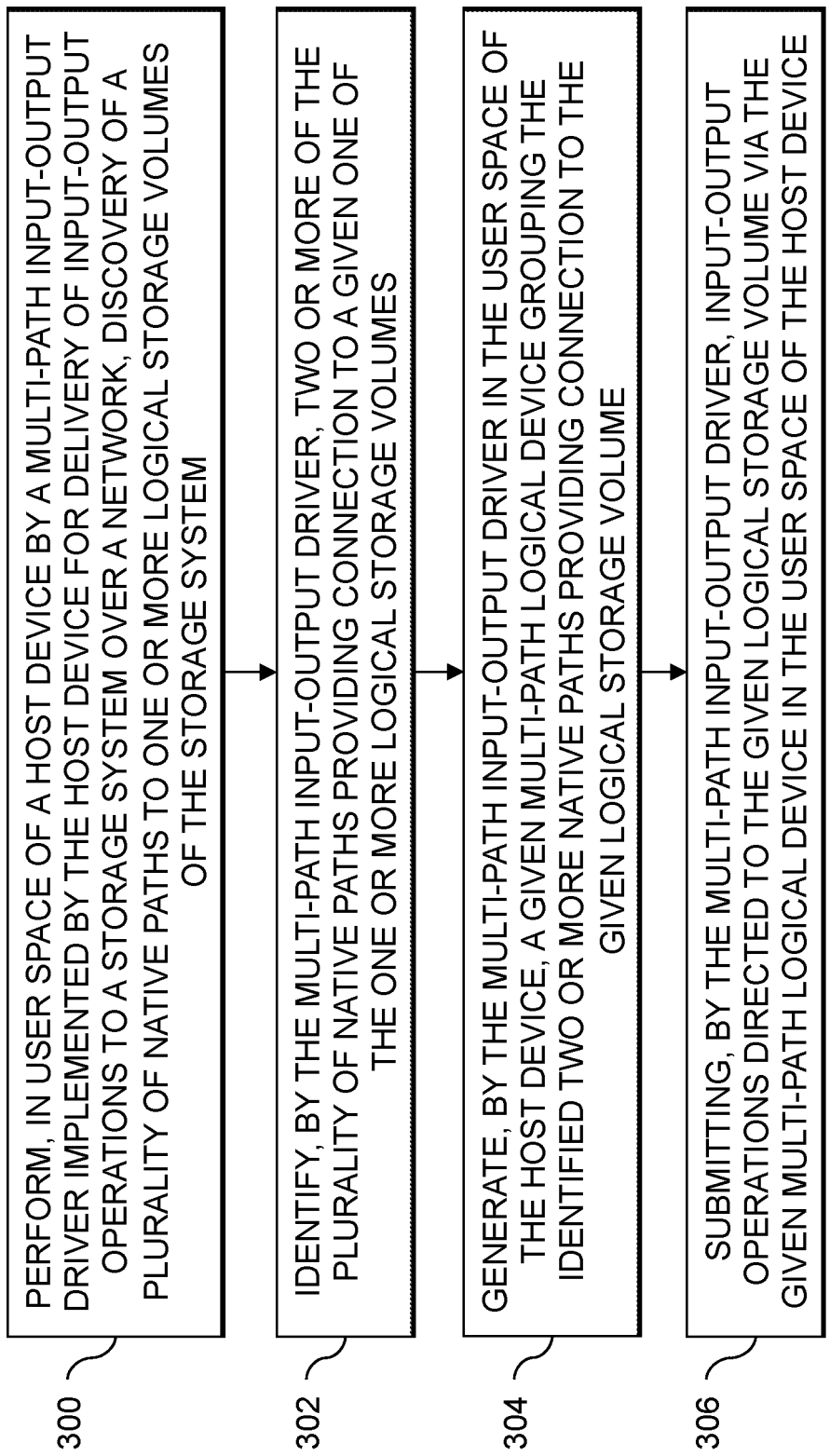
FIG. 3 is a flow diagram of an example process for performing input-out multi-pathing from user space of a host device in an illustrative embodiment.

The particular processing operations and other system functionality described in conjunction with the flow diagram of FIG. 3 are presented by way of illustrative example only, and should not be construed as limiting the scope of the disclosure in any way. Alternative embodiments can use other types of processing operations involving host devices, storage systems and user space IO multi-pathing logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different user space IO multi-pathing logic arrangements within a given information processing system.

Functionality such as that described in conjunction with the flow diagram of FIG. 3 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

Although in some embodiments certain commands used by the host devices 102 to communicate with the storage array 105 illustratively comprise SCSI or iSCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMe-oF.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems. Virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA, a GPU or other type of processing circuitry, as well as portions or combinations of such circuitry elements. The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the functional modules of MPIO driver 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, MPIO drivers, user space IO multipathing logic and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising a processor coupled to a memory configured to implement a multi-path input-output driver for delivery of input-output operations from the host device to the storage system over the network, the host device comprising a kernel space and a user space;
wherein the multi-path input-output driver is configured:
to perform, in the user space of the host device, discovery of a plurality of paths to one or more logical storage volumes of the storage system;
to identify two or more of the plurality of paths providing connection to a given one of the one or more logical storage volumes;
to generate, in the user space of the host device, a given multi-path logical device grouping the identified two or more paths providing connection to the given logical storage volume; and
to submit input-output operations directed to the given logical storage volume via the given multi-path logical device in the user space of the host device, wherein submitting the input-output operations directed to the given logical storage volume via the multi-path logical device in the user space of the host device bypasses copying of data for the submitted input-output operations from the user space of the host device to the kernel space of the host device.

2. The apparatus of claim 1 further comprising one or more additional host devices each configured to communicate over the network with the storage system and wherein each additional host device comprises a multi-path input-output driver configured to control delivery of input-output operations from that host device to the storage system over selected ones of a plurality of paths through the network.

3. The apparatus of claim 1 wherein the storage devices comprise respective ones of the one or more logical storage volumes of the storage system.

4. The apparatus of claim 1 wherein performing the discovery of the plurality of paths comprises utilizing user space host interfaces to establish connection between the host device and a front end of a storage array of the storage system hosting the one or more logical storage volumes.

5. The apparatus of claim 1 wherein identifying the two or more paths providing connection to the given logical storage volume comprises:
sending a command over each of the plurality of paths for a unique identifier of its associated logical storage volume; and
identifying ones of the paths returning a given unique identifier associated with the given logical storage volume as the two or more paths providing connection to the given logical storage volume.

6. The apparatus of claim 5 wherein the given unique identifier associated with the given logical storage volume comprises a Namespace Globally Unique Identifier (NGUID) for the given logical storage volume.

7. The apparatus of claim 1 wherein generating the given multi-path logical device grouping the identified two or more paths providing connection to the given logical storage volume comprises:
forming, in a block device layer in the user space of the host device, a block device for each of the identified two or more paths providing connection to the given logical storage volume, the block device layer providing an application programming interface for implementing the block devices to interface with the given logical storage volume; and
creating a given multi-path pseudodevice as a collection of the block devices for each of the identified two or more paths providing connection to the given logical storage volume.

8. The apparatus of claim 7 wherein the given multi-path pseudodevice comprises a data structure specifying:
a multi-path identifier for the given multi-path pseudodevice;
a unique identifier of the given logical storage volume; and
identifiers of the block devices formed for each of the identified two or more paths providing connection to the given logical storage volume.

9. The apparatus of claim 1 wherein the given multi-path logical device provides multi-pathing functionality for applications running in the user space of the host device independent of a transport protocol utilized by the identified two or more paths providing connection to the given logical storage volume.

10. The apparatus of claim 1 wherein submitting the input-output operations directed to the given logical storage volume via the given multi-path logical device in the user space of the host device comprises bypassing the kernel space of the host device.

11. The apparatus of claim 10 wherein bypassing the kernel space of the host device comprises providing the data of the submitted input-output operations directly to the storage system over at least one of the identified two or more paths providing connection to the given logical storage volume via at least one of the plurality of communication adapters.

12. The apparatus of claim 1 wherein the host device is further configured:
to identify two or more of the plurality of paths providing connection to an additional one of the one or more logical storage volumes;
to generate, in the user space of the host device, an additional multi-path logical device grouping the identified two or more paths providing connection to the additional logical storage volume; and
to submit input-output operations directed to the given logical storage volume via the additional multi-path logical device in the user space of the host device.

13. The apparatus of claim 1 wherein submitting the input-output operations directed to the given logical storage volume via the given multi-path logical device in the user space of the host device comprises utilizing the given multi-path logical device to provide load balancing across the identified two or more paths providing connection to the given logical storage volume.

14. The apparatus of claim 1 wherein submitting the input-output operations directed to the given logical storage volume via the given multi-path logical device in the user space of the host device comprises utilizing the given multi-path logical device to provide input-output failover by re-routing a given input-output operation from a failed one of the identified two or more paths providing connection to the given logical storage volume to an alive one of the identified two or more paths providing connection to the given logical storage volume.

15. A method comprising:
performing, by a multi-path input-output driver implemented by a host device configured to communicate over a network with a storage system comprising a plurality of storage devices, discovery of a plurality of paths to one or more logical storage volumes of the storage system, the host device comprising a kernel space and a user space;
identifying, by the multi-path input-output driver, two or more of the plurality of paths providing connection to a given one of the one or more logical storage volumes;
generating, by the multi-path input-output driver in the user space of the host device, a given multi-path logical device grouping the identified two or more paths providing connection to the given logical storage volume; and
submitting, by the multi-path input-output driver, input-output operations directed to the given logical storage volume via the given multi-path logical device in the user space of the host device, wherein submitting the input-output operations directed to the given logical storage volume via the multi-path logical device in the user space of the host device bypasses copying of data for the submitted input-output operations from the user space of the host device to the kernel space of the host device.

16. The method of claim 15 wherein generating the given multi-path logical device grouping the identified two or more paths providing connection to the given logical storage volume comprises:

forming, in a block device layer in the user space of the host device, a block device for each of the identified two or more paths providing connection to the given logical storage volume, the block device layer providing an application programming interface for implementing the block devices to interface with the given logical storage volume; and
creating a given multi-path pseudodevice as a collection of the block devices for each of the identified two or more paths providing connection to the given logical storage volume.

17. The method of claim 16 wherein the given multi-path pseudodevice comprises a data structure specifying:
a multi-path identifier for the given multi-path pseudodevice;
a unique identifier of the given logical storage volume; and
identifiers of the block devices formed for each of the identified two or more paths providing connection to the given logical storage volume.

18. A computer program product comprising a non-transitory processor-readable storage medium having stored therein program code of one or more software programs, wherein the program code, when executed by a multi-path input-output driver implemented by a host device configured to communicate over a network with a storage system comprising a plurality of storage devices, causes the multi-path input-output driver:
to perform, in a user space of the host device, discovery of a plurality of paths to one or more logical storage volumes of the storage system, the host device comprising a kernel space and the user space;
to identify two or more of the plurality of paths providing connection to a given one of the one or more logical storage volumes;
to generate, in the user space of the host device, a given multi-path logical device grouping the identified two or more paths providing connection to the given logical storage volume; and
to submit input-output operations directed to the given logical storage volume via the given multi-path logical device in the user space of the host device, wherein submitting the input-output operations directed to the given logical storage volume via the multi-path logical device in the user space of the host device bypasses copying of data for the submitted input-output operations from the user space of the host device to the kernel space of the host device.

19. The computer program product of claim 18 wherein generating the given multi-path logical device grouping the identified two or more paths providing connection to the given logical storage volume comprises:
forming, in a block device layer in the user space of the host device, a block device for each of the identified two or more paths providing connection to the given logical storage volume, the block device layer providing an application programming interface for implementing the block devices to interface with the given logical storage volume; and
creating a given multi-path pseudodevice as a collection of the block devices for each of the identified two or more paths providing connection to the given logical storage volume.

20. The computer program product of claim 19 wherein the given multi-path pseudodevice comprises a data structure specifying:

a multi-path identifier for the given multi-path pseudodevice;

a unique identifier of the given logical storage volume; and identifiers of the block devices formed for each of the identified two or more paths providing connection to the given logical storage volume.

* * * * *